United States Patent [19]

Maher et al.

[11] Patent Number: 4,898,844

[45] Date of Patent: Feb. 6, 1990

[54] PROCESS FOR MANUFACTURING A CERAMIC BODY HAVING MULTIPLE BARIUM-TITANATE PHASES

[75] Inventors: Galeb H. Maher, North Adams; Susan E. Stefanik, Adams, both of Mass.

[73] Assignee: Sprague Electric Company, North Adams, Mass.

[21] Appl. No.: 885,509

[22] Filed: Jul. 14, 1986

[51] Int. Cl.[4] .............................................. C04B 35/46
[52] U.S. Cl. ..................................... 501/138; 501/137; 501/139; 252/62.9
[58] Field of Search ...................... 501/137, 138, 139; 252/62.9

[56] References Cited

U.S. PATENT DOCUMENTS

| | | | |
|---|---|---|---|
| 3,231,799 | 1/1966 | Prokopowicz et al. | 501/137 X |
| 3,279,947 | 10/1966 | Kaiser | 501/138 X |
| 3,637,532 | 1/1972 | Ramisch et al. | 501/137 X |
| 4,061,584 | 12/1977 | Girard et al. | 501/137 X |
| 4,283,752 | 8/1981 | Layton | 361/321 |
| 4,283,753 | 8/1981 | Burn | 361/321 |
| 4,392,180 | 7/1983 | Nair | 501/138 X |
| 4,540,676 | 9/1985 | Chu et al. | 501/138 |

FOREIGN PATENT DOCUMENTS 2508436 12/1982 France .................................. 501/137

OTHER PUBLICATIONS

Kahn, "Preparation of Small—Grained and Large—Grained Ceramics from Nb—Doped $BaTiO_3$", J. Amer. Ceram. Soc., vol. 54, No. 9, Sep. 1971.

Primary Examiner—Mark L. Bell
Assistant Examiner—Karl Group

[57] ABSTRACT

A ceramic includes a dielectric ceramic body that is made by mixing powders of two barium titanate compositions of widely disparate Curie temperature with a minor quantity of a borate flux and a sintering-inhibitor such as titania or bismuth oxide. A body is formed of this start powders mixture. Upon sintering to maturity at about 1100° C., the capacitor body becomes only partially co-reacted and has a dielectric constant around 2000 that varies no more than about 15% over a board operating temperature range. These properties are not a strong function of sintering conditions leading to good control at manufacturing.

8 Claims, 1 Drawing Sheet

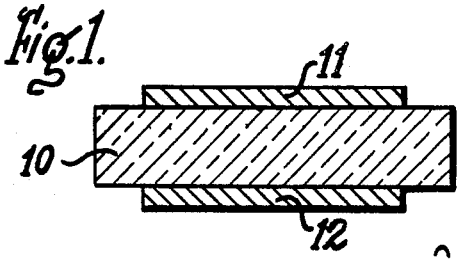
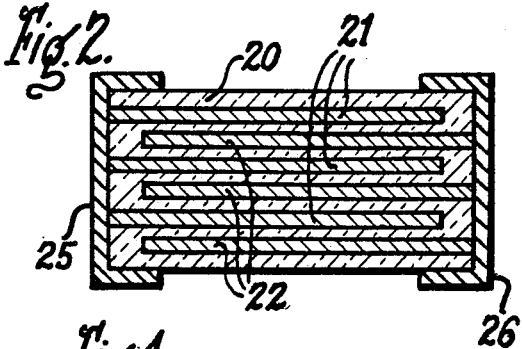
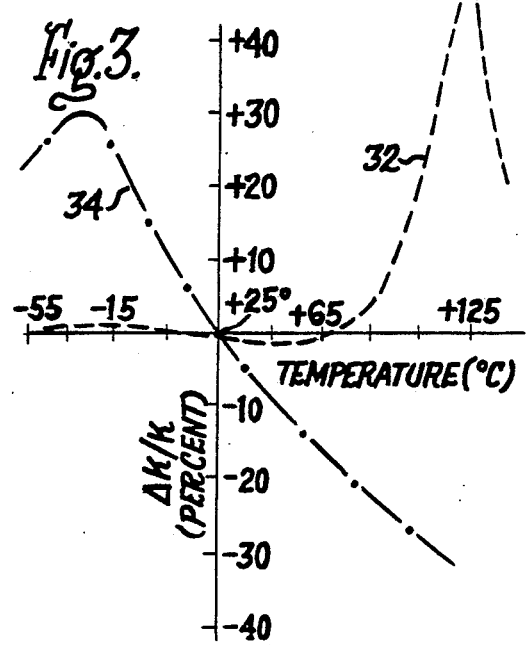
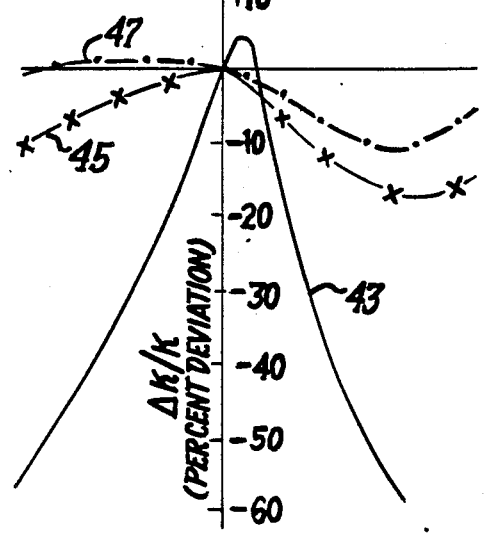
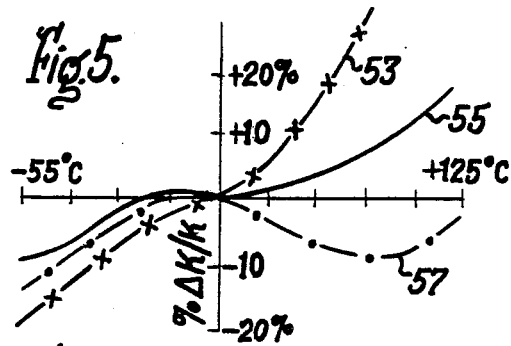
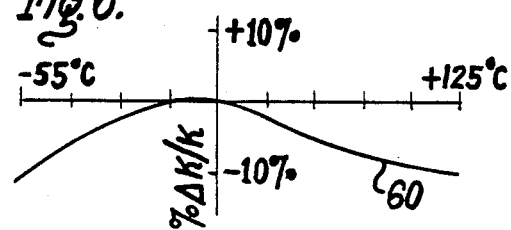
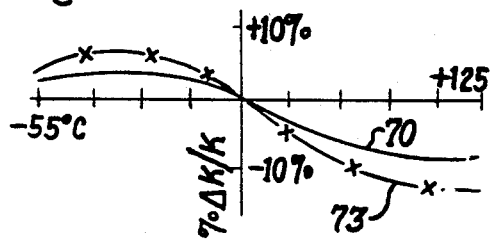

PROCESS FOR MANUFACTURING A CERAMIC BODY HAVING MULTIPLE BARIUM-TITANATE PHASES

BACKGROUND OF THE INVENTION

This invention relates to a method for making a dielectric ceramic body and more particularly wherein two powders of differently-doped barium titanates are mixed, formed into a body and sintered to maturity with only a partial reaction between the two types of barium titanate grains.

Pure polycrystalline barium titanate has a dielectric constant that is relatively unchanging with changes in temperature except for a large spike at 125° C. This is the Curie temperature at which the dielectric constant may be as much as an order of magnitude larger than at room temperature. It is well known to dope barium titanate with Curie point shifters to move the spike and Curie temperature to a desired temperature at which a high dielectric constant is needed, e.g. 25° C. Such downward Curie point shifters are niobium, lanthanum, strontium, zirconium. etc. On the other hand, a small doping addition of lead or of yttrium in the barium titanate will raise the Curie temperature.

Such a doped polycrystalline barium titanate body for use as a capacitor dielectric may be made by mixing the powders of pure barium titanate (or alternatively precursors thereof such as $BaCO_3$ and $TiO_2$) and a powder of a precursor, e.g. $Nb_2O_5$, of the dopant cation, e.g. $Nb^{+5}$, then compressing the mixture in a mold or otherwise forming a body of the powder mixture, and firing the body to cause the dopant to react with and enter substitutionally into the crystalline grains of the barium titanate. The "small" cation $Nb^{+5}$ as the dopant will displace small titanium cations ($Ti^{+4}$) in the crystal lattice. The "large" cation $La^{+3}$ as the dopant will displace large barium cations ($Ba^{+2}$) in the crystal lattice. Such dopant substitutions and their effects are more fully explained, for example, in the patent to Burn U.S. Pat. No. 4,283,753 issued Aug. 11, 1981 and assigned to the same assignee as is the present invention.

When the firing is long enough and hot enough to effect a thorough and homogeneous penetration of the dopant within each and all of the barium titanate grains, a high dielectric constant (K) may be achieved, but the temperature coefficient (TC) of the dielectric constant will vary greatly over the temperature ranges of commercial interest.

A much flatter TC is often needed, as is reflected in the widely employed commercial standard that is designated X7R calling for no greater change in the dielectric constant from the value at 25° C. than ±15% over the temperature range of −55° C. to 125° C. Ceramic compositions of mainly barium titanate have been made that meet that standard.

An early one of such compositions is described in the patent to Prokopowicz U.S. Pat No. 3,231,799 issued Jan. 25, 1966 wherein a dopant, e.g. niobium, was reacted with barium titanate at a sintering for 1 hour at 2320° F. (1271° C.) using no glass containing sintering aid. It is recognized that the reaction (without flux) at sintering in the Prokopowicz' patent was incomplete, not having heated long enough, or alternatively hot enough, to permit a homogeneous dispersion of the niobium dopant throughout each grain, and furthermore there was essentially no grain growth.

It is postulated that each of the small Prokopowicz' grains has a high concentration of the niobium dopant near the grain surface, which concentration diminishes rapidly toward the grain center at which it is essentially zero. In this model the Curie point of the grain surface is lowest and the Curie temperature rises as the grain center is approached. Thus each and every barium titanate grain is doped in the same way and each has the same mildly varying dielectric constant as a function of its temperature.

This composition has the drawback, however, that the particular TC achieved is a strong function of the sintering conditions and of the start barium titanate grain size.

Another but recently disclosed composition is quite similar to that of Prokopowicz except for including a sintering aid to provide a lower sintering temperature. The addition of a flux or sintering aid is known to promote liquid phase sintering, whereby the barium titanate dissolves in the liquid flux and simultaneously recrystallizes. Such an aid, or flux, permits sintering at a lower temperature or otherwise speeds up the sintering process. Apparently here again, each and every barium titanate grain has the same mildly temperature varying dielectric constant as does every other grain Another approach to making an X7R ceramic is to provide a ceramic body that is a mixture of two different kinds of ceramic grains and presumably having dissimilar Curie temperatures. A known example is comprised of a mixture of a rhombohedral phase crystalline material with a tetragonal phase crystalline material precipitated from a liquid flux at sintering from a mixture of start materials including compounds of barium, strontium, lead, niobium and a flux.

It is therefore an object of this invention to provide a partially reacted ceramic dielectric material exhibiting a high dielectric constant and a smooth temperature coefficient that are more predictable and more controllable in manufacture.

SUMMARY OF THE INVENTION

A dielectric body is made by mixing a first barium titanate powder A having a Curie temperature greater than 100° C., a second barium titanate powder B having a Curie temperature less than 0° C., a minor quantity, preferably less than 4 weight percent, of a glass borate powder C and preferably less than 2½ weight percent of a powdered sintering-inhibitor agent D: forming a body of the mixture and sintering the body to maturity.

The inhibitor may be an oxide of bismuth, titanium, antimony, zirconium, hafnium and combinations thereof. The inhibitor has the effect of impeding and limiting the reaction between the adjacent grains of the different powders to the further effect that the limited reaction produces ceramic grains having a broad continuous spectrum of intermediate compositions in a body having a relatively smooth temperature coefficient of dielectric constant over a wide range of temperatures.

BRIEF DESCRIPTION OF THE DRAWING

FIG. 1 shows in side sectional view a wafer or disc type ceramic capacitor of this invention.

FIG. 2 shows in side sectional view a monolithic ceramic capacitor of this invention.

FIGS. 3 through 7 show graphs of the deviation in the dielectric constant, K, from the value at room temperature, 25° C., for various ceramic materials as a function of temperature. All the graphs are shown at the same scale both with respect to %ΔK and temperature.

DESCRIPTION OF THE PREFERRED EMBODIMENTS

A number of experimental wafer type capacitors were made as shown in FIG. 1. The wafer bodies 10 were first formed by the conventional steps of combining start ceramic precursor powders and powdered flux, if any, in an organic vehicle and binder medium, milling this slurry mixture to provide homogenous distribution of the particles in the slurry, casting the slurry by doctor blade technique to form a cast sheet, cutting the sheet into square wafers having green dimensions of about 1 cm×1 cm×0.5 mm thickness and drying the wafers by heating to 800° C. for about ½ hour. The square wafers were then fired at 1100° C. (unless otherwise noted) in a closed crucible. A silver electroding paste was then applied to the two major faces of each mature ceramic wafer and fired at 800° C. to form two capacitor electrodes 11 and 12 (FIG. 1).

Some experimental monolithic capacitors were made by the following conventional steps. The precursor powders of high firing barium titanates were mixed with a low firing glass flux in a vehicle. The vehicle was basically a mixture of 70 weight percent xylene and 30 weight percent amyl acetate to which there had been added 4 weight percent of a butylmethacrylate and 1 percent lecithin. This slurry containing about 70% by weight solids was milled for about six hours.

Successive coatings of the milled slurry were applied over a glass substrate, drying each layer in turn and screen printing an electroding paste of 70% silver and 30% palladium to the cast dried layer. Before applying the next successive dielectric layer, the screened pattern of electroding paste was dried. The body 20, as shown in FIG. 2 with buried electrodes 21 and 22, was cut from the stack, baked out at 800° C. and fired to maturity at 1100° C. for 2½ hours in a closed crucible. A silver paste was then applied to either end of body 20 at which edges of the buried electrodes were exposed. The body was fired at 750° C. for a few minutes to form silver terminations 25 and 26.

A high purity capacitor grade barium titanate powder having an average particle size of about 1 micron was combined with 4 weight percent of a powdered borate glass flux, $CdO.2ZnO.B_2O_3$. This start powder mixture was used to make wafer capacitors according to the above-noted procedure. Measurements of the capacitances of these capacitors as a function of temperature led to the curve 32 plotted in FIG. 3, displaying percent deviation of the dielectric constant of the ceramic as a function of operating temperature. It is believed that dissolution and recrystallization of the barium titanates in the flux were limited to the surface of the grain, but the core of the grain remained unchanged. The well known Curie temperature at 125° C. of barium titanate is that above which the crystal structure is cubic and below which it is tetragonal. The Curie temperature $T_c$ corresponds to the peak temperature in the curve 32.

A second group of wafer capacitors were made starting with a niobium doped barium titanate powder and 4 weight percent of the same borate flux as in the first group. The doped barium titanate was prepared by mixing barium oxide, titania and niobium carbonate in an amount corresponding to 5.3 weight percent niobium pentoxide ($Nb_2O_5$) This mixture was calcined at a temperature of 1230° C. At calcining, each niobium atom enters the barium titanate lattice and displaces a titanium atom. It was found that the calcining temperature must be restrained to lie between 1190° C. and 1275° C. to produce doped powder having an average particle size between 0.5 and 1.0 micron. The resulting wafer capacitors exhibit a deviation in the dielectric constant versus operating temperature as shown by curve 34 in FIG. 3. The Curie temperature of this niobium doped barium titanate material has been shifted down to about −30° C.

In both of the above-described barium titanate dielectrics, the borate flux has become a small second and glassy phase at the grain boundaries of the dominant barium titanate phase. There is apparently the same limited reaction at sintering between the dominant crystalline phase and the glass phase, e.g. there is no effect on Curie temperature.

In a third experiment, the powdered start materials of the first group capacitors (pure $BaTiO_3$ and 4 wt% flux) was mixed with the powdered start materials of the second group capacitors (niobium doped $BaTiO_3$ and 4 wt% flux. The weight amount of the pure $BaTiO_3$ powder A and the weight amount of niobium doped powder B were such that A/A+B+F) is 0.60 or 60% and B/(A+B+F) is 0.36 or 36%, where F is the weight of the flux (4%). This three component powder mixture was used as the start material for making the third group of capacitors. The characteristic percent deviation in K as a function of operating temperature is shown by curve 43 in FIG. 4.

Curve 43 reveals a Curie temperature of about +35° C., intermediate the Curie temperature of the two barium titanate powders of the start materials. This amounts to a downward shift in the Curie temperature of about 50° C. for every mole of niobium that has reacted with and doped the barium titanate. It is thus clear that the niobium has become equally dispersed in each of the barium titanate grains in the amount of about 1.4 mole % niobium or at about 1.9 wt% niobium pentoxide.

Barium titanate will not sinter at 1100° C. without flux. The mechanism by which a glass flux aids sintering is known as liquid phase sintering wherein there occurs the simultaneous dissolution and recrystallization of barium titanate in and out of the melted flux. During the liquid phase sintering the niobium dopant diffuses through the liquid flux into the grains as they recrystallize.

A fourth group of capacitors, monolithic capacitors, was made whereby the start materials were nearly the same mixture of (67 wt%) pure $BaTiO_3$, (30 wt%) niobium doped $BaTiO_3$ and (2 wt%) borate flux, except that a pinch (1 wt%) titania powder was added. A dramatic change was effected in the characteristic deviation in capacitor dielectric constant K as a function of operating temperature as shown in curve 45 of FIG. 4.

A fifth group of monolithic capacitors was made wherein a further addition to the start materials in the fourth experiment of 1 weight percent $Bi_2O_3$ was made. The deviation of dielectric constant K in these capacitors is even smaller over the operating temperature range of −55° C. to 125° C.

Titania and bismuth trioxide inhibit the reaction between the two barium titanate phases at sintering. It is believed that under the influence of one or more of these inhibitors there are created sintered barium titanate grains separated by a borate flux, the grains having a spectrum of average niobium-doping concentration levels grain-to-grain between zero and 5%. It is expected that other inhibitor compounds will include antimony, tantalum, hafnium and zirconium. It is clear, however, that the titanium including compound, barium titanate, will not serve as an inhibitor. In a separate experiment the additive bismuth titanate was also shown to have no inhibiting effect. In general, an inhibitor must be in the form of the oxide, carbonate, oxylate and other oxide equivalent that is capable of becoming decomposed at sintering leaving the inhibitor atom so that the "inhibitor element", e.g. Bi, will be free to react with the surface of the barium titanate grains.

A series of sixth, seventh and eighth experimental wafer capacitors each employed a start powder mixture of 30 wt% of the 5% niobium doped barium titanate, 2.5 wt% of the borate flux and 1 wt% titania. In the start powders of the sixth, seventh and eighth capacitors there were respectively added no $Bi_2O_3$, 1.5 wt% $Bi_2O_3$ and 3.0 wt% $Bi_2O_3$. The remainder of the start mixtures were made up of the pure barium titanate (in amounts 66.5, 65 and 63.5 wt%, respectively). The corresponding $\Delta K/K$ vs. T curves 57, 55 and 53 are shown respectively in FIG. 5. There it is seen that the reaction inhibiting effect of bismuth is quite powerful.

The curve 60 in FIG. 6 is that of a ninth group of capacitors made as the monolithic kind having a particularly desirable set of performance characteristics. The dielectric constant varies no more than 11% over the whole temperature range and the dielectric constant at 25° C. is 2230. The large cation $La^{+3}$ is employed as the Curie temperature depressing dopant. It displaces the $Ba^{+2}$ at the large cation sites in the barium titanate crystal. In addition, lead is used as a dopant for raising the Curie temperature. The lead also displaces $Ba^{+2}$ ions as covalent $Pb^{+2}$.

The ninth group, of monolithic capacitors, has a start powder mixture of (A) 60 wt% of a barium titanate powder doped with 5 wt% PbO, (B) 37.5 wt % of a barium titanate powder doped with 7.5% lanthanum oxide, (C) 1.5 wt% of a borate flux powder and (D) 1.0 wt% $Bi_2O_3$. There had bee added at calcining 0.1 wt% manganese carbonate in each of the barium titanates for improving the capacitor leakage resistance. But to be effective this manganese had to be calcined into powders A and B It has essentially no effect on the Curie temperature.

The tenth group, of monolithic capacitors, has a start powder mixture of (A) 59.4 wt% of a pure (except for a tiny amount of manganese) barium titanate, (B) 37.5 wt% of a barium titanate powder doped with 7.5 wt% lanthanum oxide, (C) 1.5 wt% of the borate flux powder and (D) 1.6 wt% $Bi_2O_3$. Both phases A and B also included 0.1% manganese carbonate etc.

As shown by curve 70 in FIG. 7, the capacitance (and K) of these capacitors varies no more than 8% over the entire operating temperature range and at 25° C. has a dielectric constant of about 2000. These capacitors were very small having thin active dielectric layers of 0.6 mil (15 microns) and forty buried electrodes. Some of these capacitors, instead of being sintered at 1100° C. for 2½ hours, were sintered at 1100° C. for 18 hours. The room temperature dielectric constant of these long-fired capacitors increased 7% and %ΔK/K is not quite as smooth as shown by curve 73 in FIG. 7. This demonstrates a surprising stability of capacitor properties in the face of an extreme change in sintering conditions. These capacitors, as well as those of groups 4, 5, 6, 7, 8 and 9, incorporate a myriad-phased ceramic material that must be only partially reacted to provide the desired smoothness of the capacitance as a function of operating temperature. This stability assures control of the manufacturing process leading to predictability of capacitance properties in the end product.

That a partially reacted ceramic composition such as this one can provide a stable low TCC and K even when the sintering time is varied over such a wide range seems remarkable. But it was surprising to find that with a constant 2½ hour sintering time, similar stability was observed for samples (of the same formulation as example 10 except using 1.4 weight percent bismuth oxide) that were respectively sintered at 1050° C., 1075° C., 1100° C. and 1220° C. The dielectric constant varied a maximum of only 12% from the value of the 1100° C. fired unit and the TCC varied from the 1100° C. firing value only 3% at −55° C. and only 2% at 125° C. Incredibly, the TCC hardly changed at all. These indications of insensitivity as a function of manufacturing parameters are not understood but represent unusual and desirable traits especially for an X7R type ceramic.

In the practice of this invention, other Curie point depressing dopants than niobium and lanthanum may be used, such as arsenic, bismuth, and antimony. Also, other low melting glass fluxes may be used although borate fluxes are preferred (e.g. over silicates) for their lower melting temperature and what appears to be their more efficient wetting of the barium titanate grains during sintering.

Capacitors of groups three through ten, representing capacitors having ceramic bodies of this invention, exhibit much flatter temperature coefficients of capacitance than do capacitors of groups one and two.

In the ten experiments described above, the sintered bodies were all about 95% of theoretical density and have excellent properties. Higher temperatures generally produce more dense bodies, but at greater than 1150° C. the reactivity of the two barium titanate phases increases to a point difficult to restrain by further additives of inhibitor agents such as $Bi_2O_3$. It is well established that by the further addition of a glass sintering flux, the sintering temperature at which such high densities can be achieved is reduced. However, larger flux amounts create a larger intergranular glassy phase of low dielectric constant and the overall dielectric constant is thereby seriously depressed and the utility as an X7R type body is degraded commensurately. Therefore, sintering temperatures in the method of this invention are restricted to the range 1000° C. to 1150° C. and the flux is preferably limited to within 1 and 4 weight percent.

The reactivity of the two start barium titanate phases employed in making the ceramic of this invention is dependent upon the particle sizes of those start powders. That dependency is easily managed, also. For example, each of two mixtures of start powders were prepared including 59.5 wt% pure barium titanate, 37.5 wt% of the aforementioned lanthanum doped barium titanate, and 1.5 wt% glass. Both barium titanate powders were also doped at calcining using 0.1 wt% manganese carbonate. The barium titanate start powders of the first mixture had been calcined at a higher temperature than for the second mixture and had a surface area of 2.20 square meters per gram in contrast to 1.86 square meters per gram for the second mixture. Since the reactivity at sintering would be greater for the smaller grain powders, 1.9 wt% of the reactivity inhibitor $Bi_2O_3$ was added to the first start mixture whereas only 1.4 wt% $Bi_2O_3$ was added to the second start mixture.

Sintered mature bodies made from the first mixture had a room temperature dielectric constant of 2050 and was 2% less at −55° C. and −11% less at +125° C. Bodies from the second mixture under exactly the same conditions had a dielectric constant of 2000 and was 1% less at −55° C. and −10% less at +125° C. These data hardly differ at all and illustrate the effectiveness of a sintering inhibitor $Bi_2O_3$ to control grain growth even when a glass sintering aid is employed to reduce the sintering temperature at which a mature body is formed.

Although the amount of the sintering-inhibitor agent employed to achieve a desired smoothness in the temperature coefficient of dielectric constant for ceramic bodies of this invention is dependent upon the grain size of the start barium titanate powders, it is estimated that an amount larger than about 2.5 weight percent of bismuth will render the body porous even at firing temperatures as high as 1150° C.

What is claimed is:

1. A method for making a dielectric ceramic body comprising:
   (a) forming a start mixture by mixing a first barium titanate powder A having a Curie temperature greater than 120° C., a second barium titanate powder B having a Curie temperature less than 0° C., from 1 to 4 weight percent of a glass borate powder C and greater than zero but less than $2\frac{1}{2}$ weight percent of a powdered sintering-inhibitor agent D, said barium titanate A being present in a quantity by weight percent that is about twice that of said barium titanate B;
   (b) forming a body of said start mixture; and
   (c) sintering said body to produce a dense dielectric ceramic body.

2. The method of claim 1 wherein said sintering inhibitor agent D is a powdered oxide or oxide-equivalent selected from the group consisting of titanium, bismuth and combinations thereof.

3. The method of claim 1 wherein said sintering inhibitor agent D is a powdered oxide or oxide-equivalent selected from the group consisting of zirconium, hafnium, antimony, titanium, bismuth and combinations thereof.

4. The method of claim 1 wherein said barium titanate powder A consists of pure barium titanate and has a Curie temperature at 125° C.

5. The method of claim 1 wherein said barium titanate powder A is doped with lead and has a Curie temperature greater than 125° C.

6. The method of claim 1 wherein said barium titanate powder B is doped with a cation selected from the group consisting of niobium and lanthanum.

7. The method of claim 1 wherein said barium titanate powder B is doped with a cation selected from the group consisting of niobium, tantalum, bismuth, antimony, arsenic, one of the lanthanum-series rare earth elements, and combinations thereof.

8. The method of claim 1 wherein said sintering is accomplished at a peak holding temperature within the range 1000° C. to 1150° C.

* * * * *